UNITED STATES PATENT OFFICE.

WILLIAM T. GRAY, OF YORKVILLE, ASSIGNOR OF ONE-HALF HIS RIGHT TO ZOHRAB DIXON, OF BRISTOL, ILLINOIS.

IMPROVEMENT IN STOVE-POLISH.

Specification forming part of Letters Patent No. 149,302, dated April 7, 1874; application filed February 7, 1874.

*To all whom it may concern:*

Be it known that I, WM. T. GRAY, of Yorkville, in the county of Kendall and State of Illinois, have invented a certain Compound called "Fluid Stove-Polish," of which the following is a specification:

This invention relates to that class of compounds used for polishing stoves; and it consists in a composition of different materials, to be sold in such fluid condition as to be ready for use without the waste of time for dissolving powder or cakes, as heretofore only could be found in the market.

To prepare my stove-polish, I dissolve, in one pint of beer, one-half ounce of hard soap, and add to this three-quarters of an ounce of lamp-black. Now, in a separate vessel, I mix two ounces of powdered plumbago into one ounce of spirits of turpentine, and add this to the above, after which I thoroughly mix the whole mass well, when it is ready for use, and can be filled in bottles to be sold in the market.

The above-given proportions may be altered to a certain extent without affecting the quality or properties of the polish; and, for the purpose of neutralizing the unpleasant flavor of the spirits of turpentine, one dram of oil sassafras may be added to the above specified composition.

This fluid may be applied over the whole outside surface of a stove at once by means of a brush or sponge, when, after thoroughly drying, with very little rubbing, it will give to the stove a very bright and fine polish.

What I claim as my invention, and desire to secure by Letters Patent, is—

A fluid stove-polish wherein beer, hard soap, lamp-black, powdered plumbago, spirits of turpentine, and oil sassafras are compounded, substantially as described and specified.

WM. T. GRAY.

Witnesses:
J. DIXON,
E. S. FERRIS.